(12) United States Patent
Koki (10) Patent No.: US 11,462,352 B2
(45) Date of Patent: Oct. 4, 2022

(54) ELECTRONIC COMPONENT, POWER SUPPLY DEVICE, AND VEHICLE

(71) Applicant: SONY CORPORATION, Tokyo (JP)

(72) Inventor: Masayoshi Koki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/635,720

(22) PCT Filed: Jun. 19, 2018

(86) PCT No.: PCT/JP2018/023174
§ 371 (c)(1),
(2) Date: Jan. 31, 2020

(87) PCT Pub. No.: WO2019/031066
PCT Pub. Date: Feb. 14, 2019

(65) Prior Publication Data
US 2021/0134520 A1 May 6, 2021

(30) Foreign Application Priority Data
Aug. 7, 2017 (JP) .............................. JP2017-152298

(51) Int. Cl.
| | |
|---|---|
| H01F 27/29 | (2006.01) |
| H01F 27/24 | (2006.01) |
| H02M 7/217 | (2006.01) |
| B60R 16/03 | (2006.01) |
| H02M 7/00 | (2006.01) |

(52) U.S. Cl.
CPC ............ *H01F 27/29* (2013.01); *B60R 16/03* (2013.01); *H01F 27/24* (2013.01); *H02M 7/003* (2013.01); *H02M 7/217* (2013.01)

(58) Field of Classification Search
None
See application file for complete search history.

(56) References Cited

U.S. PATENT DOCUMENTS

| | | | | |
|---|---|---|---|---|
| 2009/0085707 A1* | 4/2009 | Mi | ............ | H01F 27/29 336/200 |
| 2010/0164670 A1* | 7/2010 | Nakahori | ............ | H05K 1/165 336/200 |
| 2015/0029759 A1* | 1/2015 | Takemoto | ............ | H02M 3/337 363/17 |

(Continued)

FOREIGN PATENT DOCUMENTS

| | | |
|---|---|---|
| JP | S60-204263 | 10/1985 |
| JP | H06-325949 | 11/1994 |
| JP | 2002-299130 | 10/2002 |

(Continued)

OTHER PUBLICATIONS

International Search Report prepared by the Japan Patent Office dated Aug. 6, 2018, for International Application No. PCT/JP2018/023174.

*Primary Examiner* — Jared Fureman
*Assistant Examiner* — Aqeel H Bukhari
(74) *Attorney, Agent, or Firm* — Sheridan Ross P.C.

(57) ABSTRACT

An electronic component including: a coil portion that includes a base that includes a conductive metal, a first terminal portion connected to a circuit board on which a rectifier circuit is mounted, and a second terminal portion that outputs a direct current rectified by the rectifier circuit.

20 Claims, 9 Drawing Sheets (56) References Cited

U.S. PATENT DOCUMENTS

2018/0211759 A1* 7/2018 Liu .................. H01F 27/29

FOREIGN PATENT DOCUMENTS

| JP | 2008-271645 | 11/2008 |
| JP | 2011-050160 | 3/2011 |
| JP | 2013-099086 | 5/2013 |
| JP | 2017-079545 | 4/2017 |

* cited by examiner

ELECTRONIC COMPONENT, POWER SUPPLY DEVICE, AND VEHICLE

CROSS REFERENCE TO RELATED APPLICATIONS

This application is a national stage application under 35 U.S.C. 371 and claims the benefit of PCT Application No. PCT/JP2018/023174 having an international filing date of 19 Jun. 2018, which designated the United States, which PCT application claimed the benefit of Japanese Patent Application No. 2017-152298 filed 7 Aug. 2017, the entire disclosures of each of which are incorporated herein by reference.

TECHNICAL FIELD

The present disclosure relates to an electronic component, a power supply device, and a vehicle.

BACKGROUND ART

Heretofore, various proposals have been made regarding power supply units to be used for electronic devices. Patent Document 1 below describes, as an example of a power supply unit, an insulated direct current-direct current (DC-DC) converter including a transformer.

CITATION LIST

Patent Document

Patent Document 1: Japanese Patent Application Laid-Open No. 2011-50160

SUMMARY OF THE INVENTION

Problems to be Solved by the Invention

In such a field, it is desired to, for example, prevent a loss from being caused in output from an electronic component in a power supply unit and to prevent a decrease in the efficiency of a power supply.

Therefore, it is one of the objects of the present disclosure to provide an electronic component, a power supply device, and a vehicle that can prevent a decrease in the efficiency of a power supply.

Solutions to Problems

The present disclosure is, for example,
an electronic component including:
a coil portion that includes a base that includes a conductive metal, a first terminal portion connected to a circuit board on which a rectifier circuit is mounted, and a second terminal portion that outputs a direct current rectified by the rectifier circuit.

The present disclosure is, for example,
a power supply device including:
an electronic component that includes at least a coil portion on a secondary side; a first substrate on which a rectifier circuit is mounted; and a second substrate on which the electronic component is mounted,
in which the coil portion includes a base that includes a conductive metal, a first terminal portion connected to the first substrate, and a second terminal portion connected to the second substrate, the second terminal portion being configured to output a direct current rectified by the rectifier circuit.

The present disclosure may be a vehicle including the power supply device described above.

Effects of the Invention

According to at least an embodiment of the present disclosure, it is possible to prevent a decrease in the efficiency of a power supply. Note that effects described here are not necessarily restrictive, and any of the effects described in the present disclosure may be achieved. Furthermore, the contents of the present disclosure are not construed as being limited by the exemplified effects.

MODE FOR CARRYING OUT THE INVENTION

Hereinafter, an embodiment and the like of the present disclosure will be described with reference to the drawings. Note that description will be provided in the following order.
<1. One Embodiment>
<2. Variations>
<3. Application Examples>

The embodiment and the like to be described below are suitable specific examples of the present disclosure, and the contents of the present disclosure are not limited to the embodiment and the like.

Furthermore, there are cases where expressions that define directions such as up, down, left, and right are used with reference to the illustrated directions, or the like in the following description. However, these directions are intended to facilitate understanding of the present disclosure, and do not limit the contents of the present disclosure. Moreover, in order to facilitate understanding of the present disclosure, there are cases where the direction of illustration of each member is changed as appropriate, or the size of illustration thereof is changed as appropriate.

[General Transformer]

An insulated transformer and a power supply device are described in one embodiment of the present disclosure. The transformer is an example of an electronic component, and has been applied to the power supply device. Here, a general transformer will be described so as to facilitate understanding of the embodiment.

Figure 1:
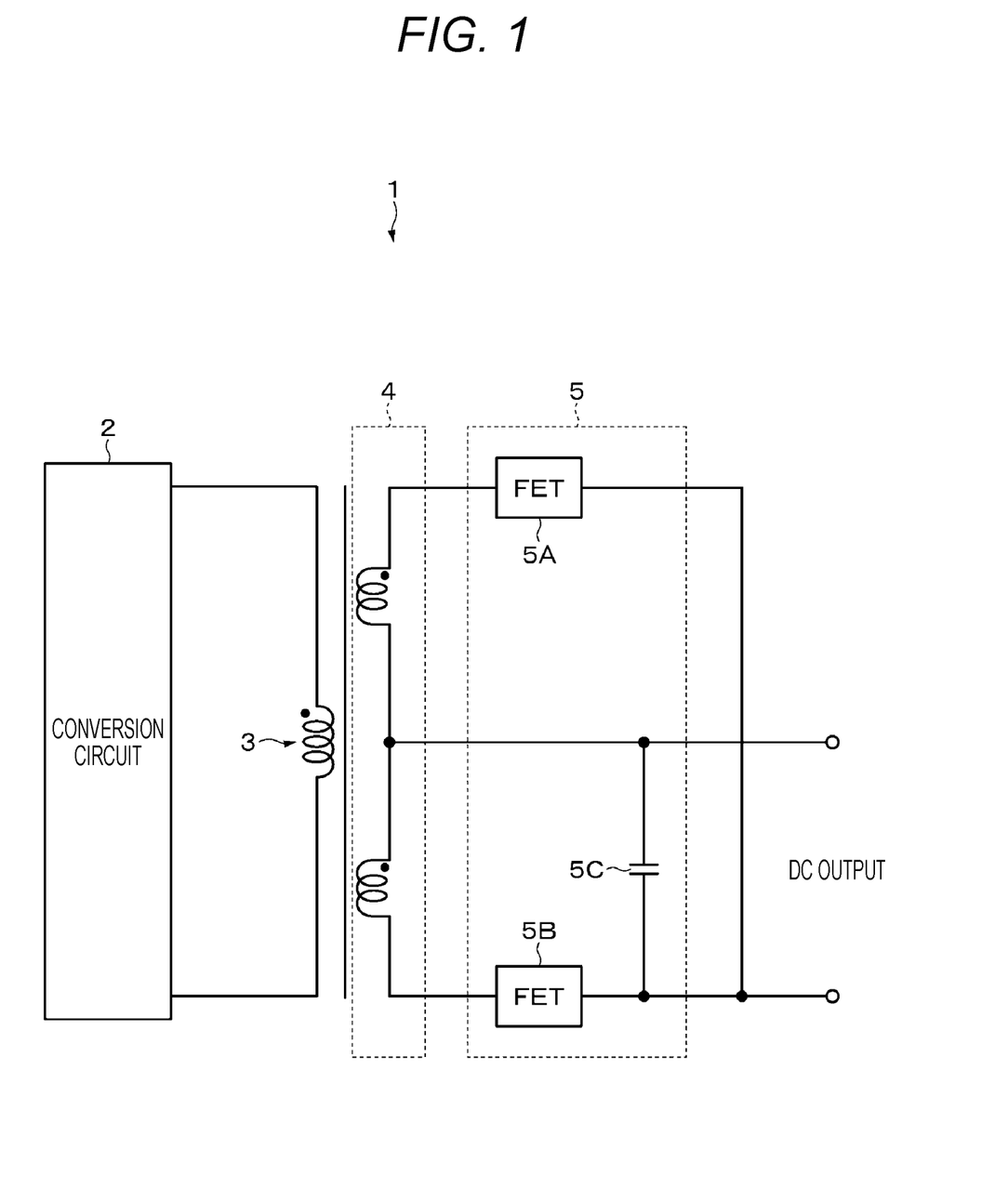
FIG. 1 is a circuit diagram showing a general circuit of a transformer.

FIG. 1 is a circuit diagram (connection diagram) of a general transformer (transformer 1). A conversion circuit 2 is provided on the primary side of the transformer 1. The conversion circuit 2 converts a direct-current (DC) voltage input to the conversion circuit 2 into an alternating-current (AC) voltage, and outputs the AC voltage to a primary coil 3. As a result of applying the AC voltage to the primary coil 3, an AC voltage is generated in a secondary coil 4 of the transformer 1. This causes an alternating current to flow. The alternating current generated in the secondary coil 4 is converted into a direct current by a synchronous rectifier (SR) circuit 5. The synchronous rectifier circuit 5 includes switching elements (for example, field effect transistors (FETs) 5A and 5B) and a rectifier capacitor 5C. The switching elements are turned on/off in a complementary manner, that is, alternately. The direct current that is an output from the synchronous rectifier circuit 5 flows to a load. Known methods (push-pull method, full-bridge method, or the like) can be applied to the conversion circuit 2 and the synchronous rectifier circuit 5.

Incidentally, a pattern is formed by use of, for example, copper foil, on a substrate on which the synchronous rectifier circuit 5 is mounted. In recent years, it has been difficult to increase the thickness of the copper foil forming the pattern due to, for example, the progress of circuit miniaturization. This increases the resistance value of the pattern. Therefore, there is a possibility that deterioration or burnout of the substrate may be caused by self-heating of the pattern when a direct current flows. Moreover, an increase in the resistance value of the pattern causes an output loss, leading to a decrease in efficiency.

Therefore, in the technique described in Patent Document 1, a large amount of current is passed through a conductor other than a printed circuit board to protect the printed circuit board from heat generation. However, this technique requires separately preparing a conductor, leading to an increase in the number of parts and cost. Furthermore, a conductor is to be added at a location where an alternating current flows instead of a direct current. Generally, when a current is passed through an AC location, a phenomenon called the skin effect occurs on a conductor. The skin effect is a phenomenon in which current intensively flows on the surface of a conductor, and is less likely to flow in the center of the conductor. That is, when an alternating current is passed through the conductor, a loss is caused by the skin effect. Moreover, addition of the conductor increases the length of an alternating current loop. Thus, there is also a possibility that the loss may increase accordingly. Described below in detail is one embodiment of the present disclosure made in view of the above points.

1. One Embodiment

[Configuration Example of Power Supply Device]

Figure 2:
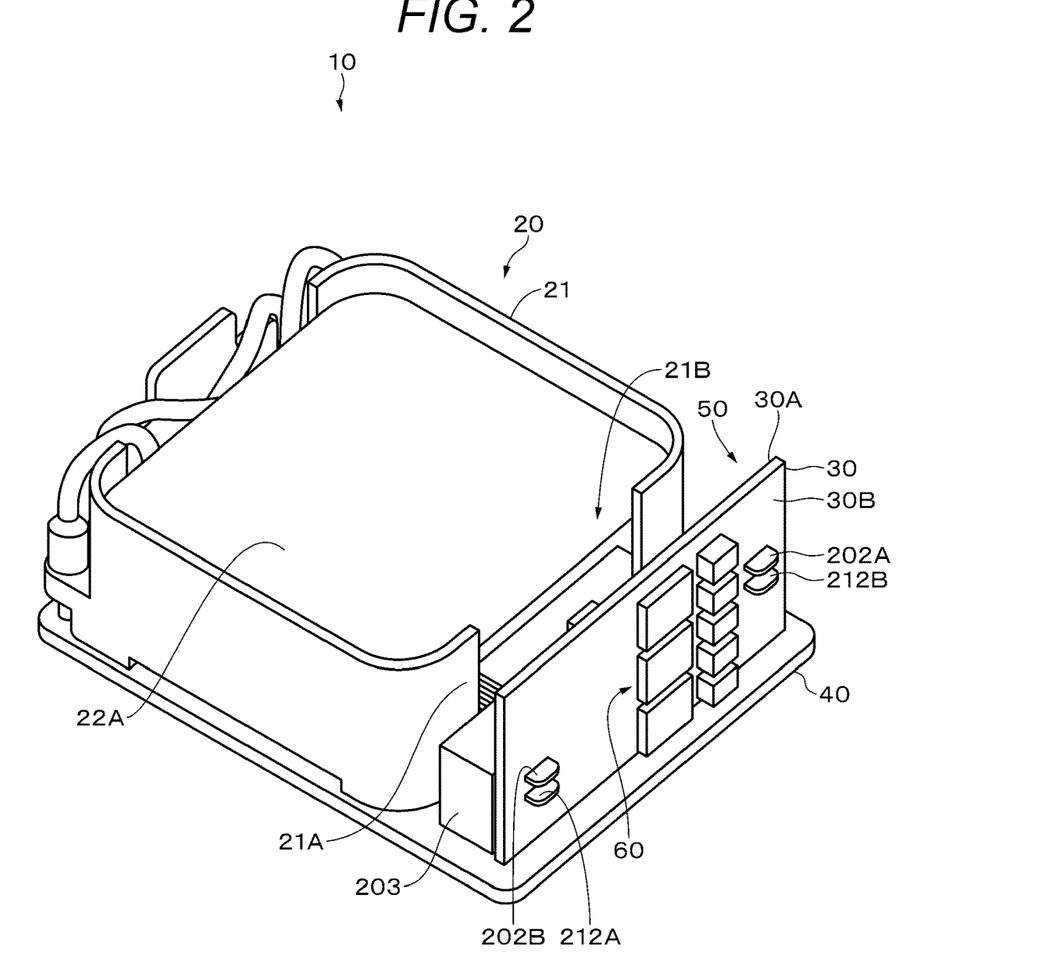
FIG. 2 is a perspective view of a configuration example of a power supply device according to an embodiment of the present disclosure.

FIG. 2 shows a configuration example of a power supply device (power supply device 10) according to one embodiment. In the embodiment, an insulated switching power supply device will be described as an example of the power supply device 10. Note that the configuration example shown in FIG. 2 is a configuration example of a part of the power supply device 10. Thus, the power supply device 10 may have a configuration other than the configuration shown in the drawing.

The power supply device 10 includes, for example, a transformer 20, a first substrate 30, and a second substrate 40. A rectifier circuit is mounted on the first substrate 30. The transformer 20 is mounted on the second substrate 40. The transformer 20 includes a cover portion 21. The cover portion 21 has a box shape with the top opened. An opening 21B is formed in one side surface 21A of the cover portion 21. A terminal portion of a secondary coil of the transformer 20 is led out of the cover portion 21 through the opening 21B.

The transformer 20 is mounted on the second substrate 40 having a thin plate shape. For example, leg portions provided at the four corners of the bottom surface of the cover portion 21 are engaged with the second substrate 40. Note that an appropriate portion of the transformer 20 is soldered to the second substrate 40. Soldering may be performed by a known method such as a so-called flow method, or may be performed manually. Thus, an arbitrary method can be applied.

The first substrate 30 has main surfaces each having a length in a longitudinal direction that is substantially the same as the length of the cover portion 21 in a longitudinal direction. For example, one of the main surfaces is a front surface 30A, and the other main surface is a back surface 30B. The first substrate 30 has a thin plate shape, and is smaller than the second substrate 40.

The first substrate 30 is supported by the second substrate 40. For example, a protrusion provided on the first substrate 30 is engaged with a hole provided in the second substrate 40, so that the first substrate 30 is supported by the second substrate 40. In the present embodiment, the first substrate 30 is supported by the second substrate 40 at a position close to the transformer 20. Specifically, the first substrate 30 is supported by the second substrate 40 such that the first substrate 30 is erected in a direction orthogonal to the second substrate 40, and that the side surface 21A of the cover portion 21 of the transformer 20 and the front surface 30A of the first substrate 30 are disposed at a predetermined distance in such a way as to face each other. The side surface 21A and the front surface 30A facing each other are disposed at a distance of, for example, 1 centimeter (cm) to 5 cm. However, the distance is not limited thereto.

As described above, a rectifier circuit is mounted on the first substrate 30. In the present embodiment, a single rectifier circuit 50 is mounted on one of the main surfaces of the first substrate 30, and a single rectifier circuit 60 is mounted on the other main surface thereof such that the rectifier circuit 50 and the rectifier circuit 60 respectively correspond to two coil portions to be described later. Note that elements included in, for example, the rectifier circuit 60, such as a rectifier FET and a rectifier capacitor (the same elements are provided in parallel in the example shown in the drawing), are schematically shown as rectangular ones in FIG. 2. Furthermore, illustration of patterns of the rectifier circuits 50 and 60 is omitted as appropriate.

First terminal portions of the secondary coil led out from the opening 21B are connected to the first substrate 30. Furthermore, second terminal portions of the secondary coil led out from the opening 21B are connected to the second substrate 40. Some of the first terminal portions are connected to the rectifier circuit 50, and the other first terminal portions are connected to the rectifier circuit 60. Note that the first terminal portions and the second terminal portions will be described later.

[Configuration Example of Transformer]

Next, the transformer 20 according to the embodiment will be described in detail. A core 22, a primary coil 23, a secondary coil 24, and the like are stored in the cover portion 21 of the transformer 20. These constituent elements are put together by use of an insulating tape or the like. The cover portion 21 is for insulating the core 22.

The core 22 is divided into upper and lower parts, for example, a core 22A and a core 22B. FIG. 2 shows the upper part, that is, the core 22A. A magnetic substance such as ferrite can be used as the material for the core 22. Depending on the purpose of use of the transformer 20, it is also possible to use, as the material for the core, a silicon-containing material such as a highlight material, an orientation material, or an amorphous material, instead of ferrite. Permalloy or the like can also be used as the material for the core. A core in any shape, such as an E-type core, is applicable.

The primary coil 23 includes, for example, an insulation coated wire such as a litz wire or a stranded wire wound with a predetermined number of turns. The primary coil is, for example, an insulation coated wire having three layers formed by thermal fusion bonding. The ends (winding-start end and winding-finish end) of the primary coil are exposed and connected to appropriate points. Two coils (primary coils 23A and 23B) with, for example, eight turns are used as primary coils in the present embodiment.

Two secondary coils (coil portions) 24A and 24B are used as secondary coils in the present embodiment.

Figure 3:
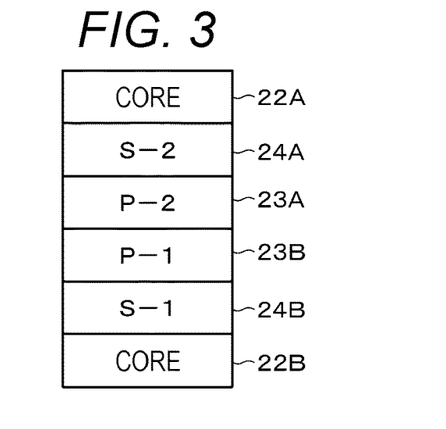
FIG. 3 is a diagram for describing an arrangement example of cores, primary coils, and secondary coils in a transformer according to the embodiment of the present disclosure.

FIG. 3 is a diagram showing an arrangement example of the core 22, the primary coil 23, and the secondary coil 24. As shown in FIG. 3, the secondary coil 24A and the secondary coil 24B are arranged between the cores 22A and 22B. The primary coil 23A and the primary coil 23B are arranged downward in this order between the secondary coils 24A and 24B. Note that although not shown in FIG. 3, a spacer is disposed between the primary coil and the secondary coil.

[Regarding Coil Portion]

Figure 4:
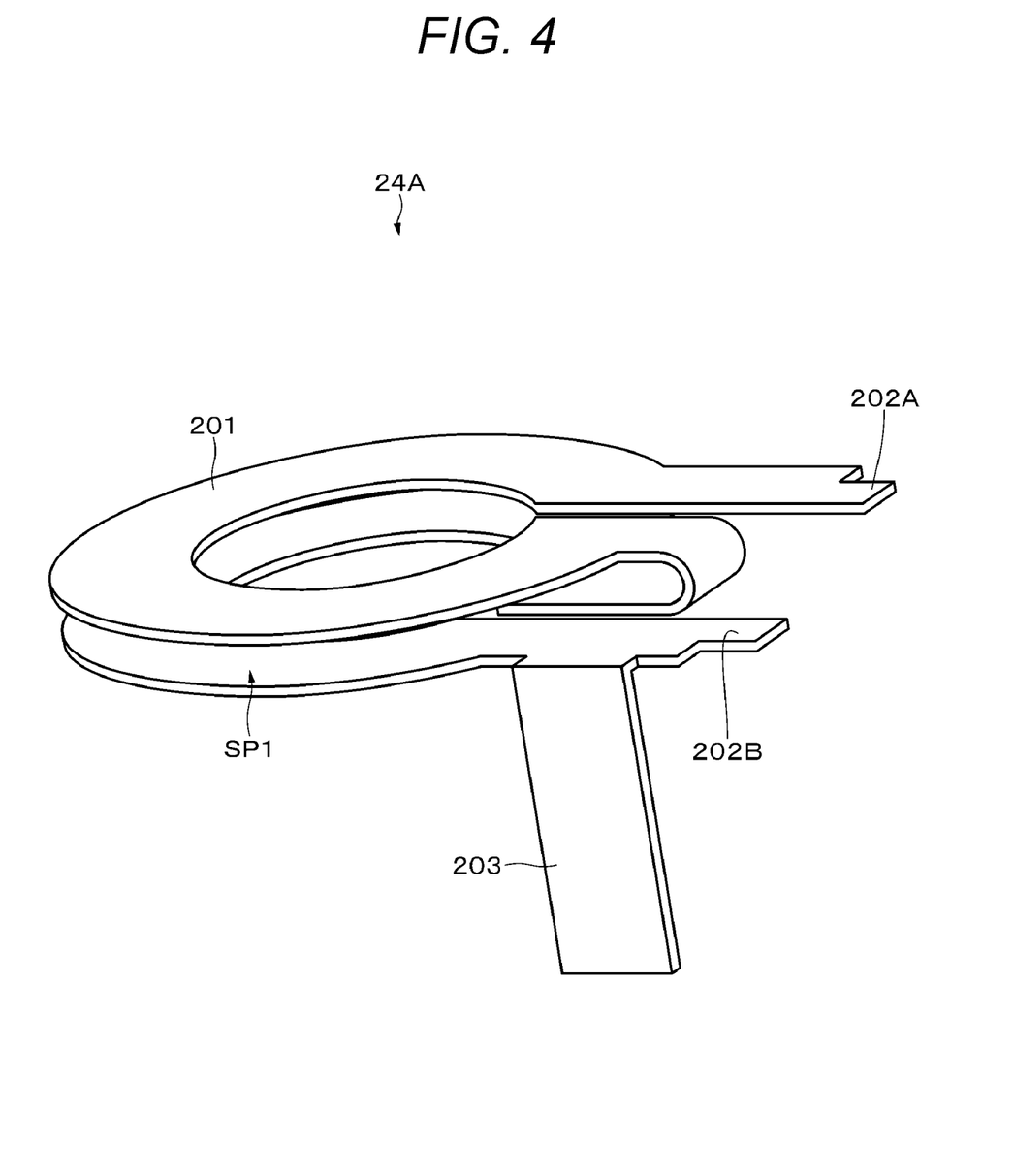
FIG. 4 is a diagram for describing a configuration example of a secondary coil according to the embodiment of the present disclosure.

Next, the secondary coil 24A and the secondary coil 24B will be described. FIG. 4 shows an example of the appearance of the secondary coil 24A. The secondary coil 24A includes a base 201, first terminal portions 202A and 202B, and a second terminal portion 203. The secondary coil 24A is formed as a result of, for example, appropriately bending a single metal plate processed into a predetermined shape by punching or the like. That is, the secondary coil 24A according to the present embodiment includes the base 201, the first terminal portions 202A and 202B, and the second terminal portion 203 formed continuously. Tough pitch copper or the like can be used as the metal plate.

The base 201 is, for example, the above-described conductive metal plate wound like a coil spring with a predetermined number of turns. The base 201 in the present embodiment is a metal plate wound with two turns. However, the number of turns can be changed as appropriate, and may be one turn or three or more turns. The primary coil 23A is disposed in a space SP1 between the upper side and lower side of the base 201. The space SP1 is formed as a result of winding the metal plate with two turns.

The first terminal portions 202A and 202B are provided at both ends of the base 201, respectively. Then, the second terminal portion 203 is provided in the vicinity of one of the first terminal portions, for example, the first terminal portion 202B. The second terminal portion 203 is, for example, a rectangular terminal that is substantially orthogonal to a direction (extending plane) in which the base 201 and the first terminal portions 202A and 202B extend.

The first terminal portions 202A and 202B are connected to the first substrate 30. The first terminal portions 202A and 202B are, for example, soldered to a pattern connected to the rectifier circuit 50 mounted on the first substrate 30. Meanwhile, the second terminal portion 203 outputs, for example, a direct current rectified by the rectifier circuit 50, and is connected to the second substrate 40 (see FIG. 2).

Figure 5:
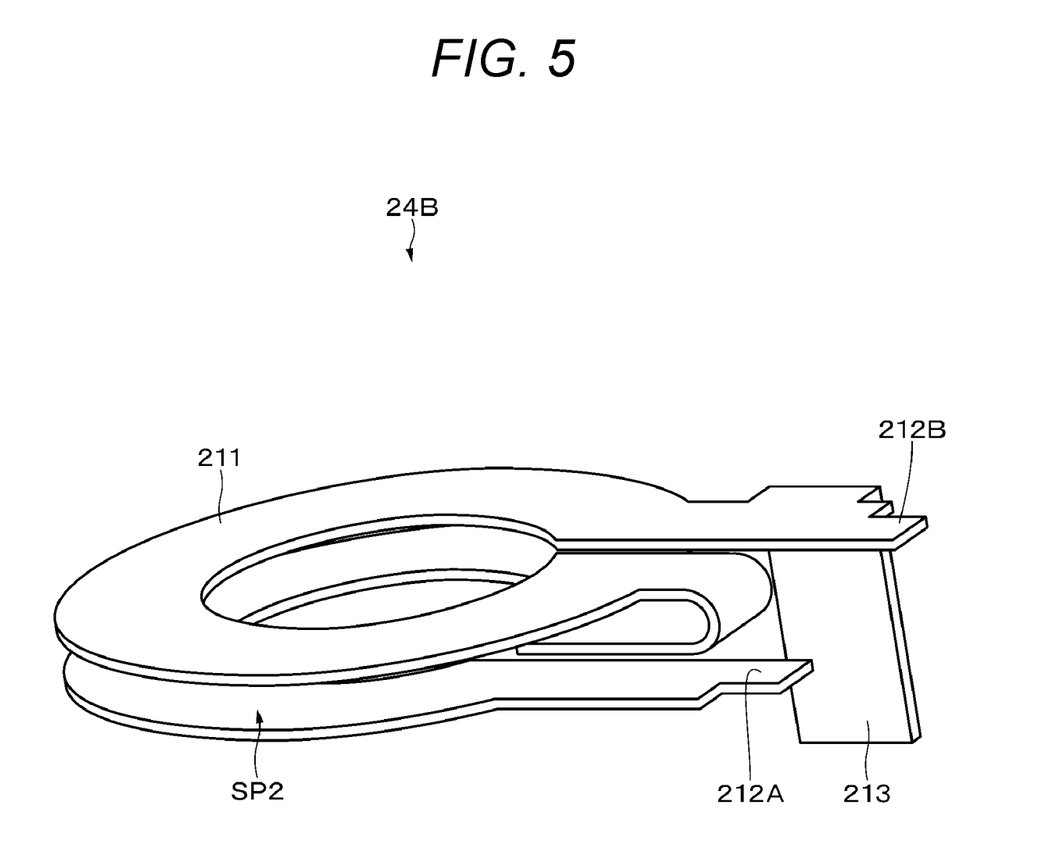
FIG. 5 is a diagram for describing a configuration example of another secondary coil according to the embodiment of the present disclosure.

FIG. 5 shows an example of the appearance of the secondary coil 24B. The shape of the secondary coil 24B is substantially similar to that of the secondary coil 24A except that a second terminal portion in the secondary coil 24B and the second terminal portion 203 in the secondary coil 24A are symmetrically positioned.

The secondary coil 24B includes a base 211, first terminal portions 212A and 212B, and a second terminal portion 213. The secondary coil 24B is formed as a result of, for example, appropriately bending a single metal plate processed into a predetermined shape by punching or the like. That is, the secondary coil 24B according to the present embodiment includes the base 211, the first terminal portions 212A and 212B, and the second terminal portion 213 formed continuously. Tough pitch copper or the like can be used as the metal plate.

The base 211 is, for example, the above-described conductive metal plate wound like a coil spring with a predetermined number of turns. The base 211 in the present embodiment is a metal plate wound with two turns. However, the number of turns can be changed as appropriate, and may be one turn or three or more turns. The primary coil 23B is disposed in a space SP2 between the upper side and lower side of the base 211. The space SP2 is formed as a result of winding the metal plate with two turns.

The first terminal portions 212A and 212B are provided at both ends of the base 211, respectively. Then, the second terminal portion 213 is provided in the vicinity of one of the first terminal portions, for example, the first terminal portion 212B. The second terminal portion 213 is a rectangular terminal that is substantially orthogonal to a direction (extending plane) in which the base 211 and the first terminal portions 212A and 212B extend.

The first terminal portions 212A and 212B are connected to the first substrate 30. The first terminal portions 212A and 212B are, for example, soldered to a pattern connected to the rectifier circuit 60 mounted on the first substrate 30. Meanwhile, the second terminal portion 213 outputs, for example, a direct current rectified by the rectifier circuit 60, and is connected to the second substrate 40 (see FIG. 2).

Figure 6:
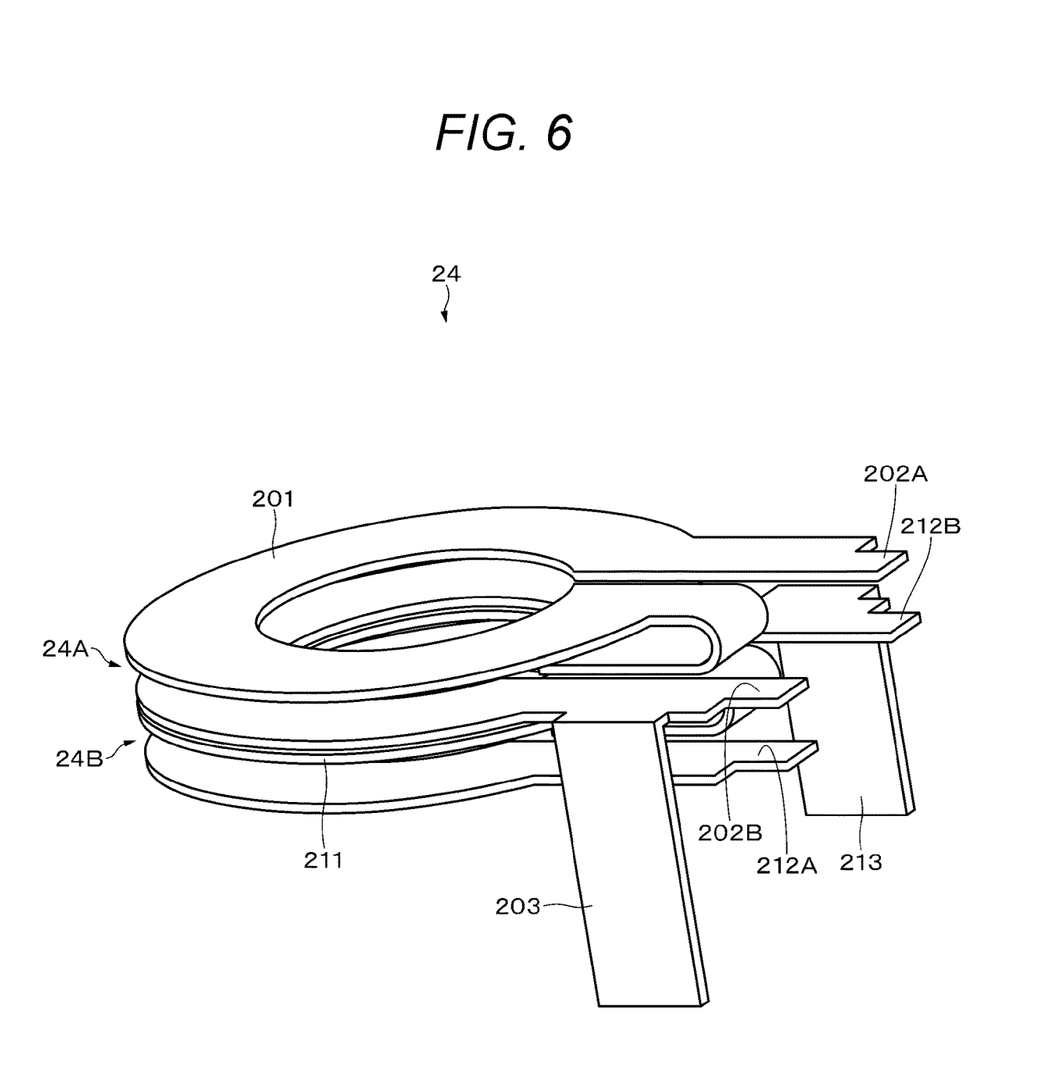
FIG. 6 is a diagram for describing an overall configuration example of the secondary coils according to the embodiment of the present disclosure.

As shown in FIG. 6, the secondary coils 24A and 24B are arranged such that the secondary coils 24A and 24B are stacked. As described above, the secondary coil 24 according to the present embodiment includes the secondary coils 24A and 24B arranged such that the secondary coils 24A and 24B are stacked.

[Transformer Operation Example]

Figure 7:
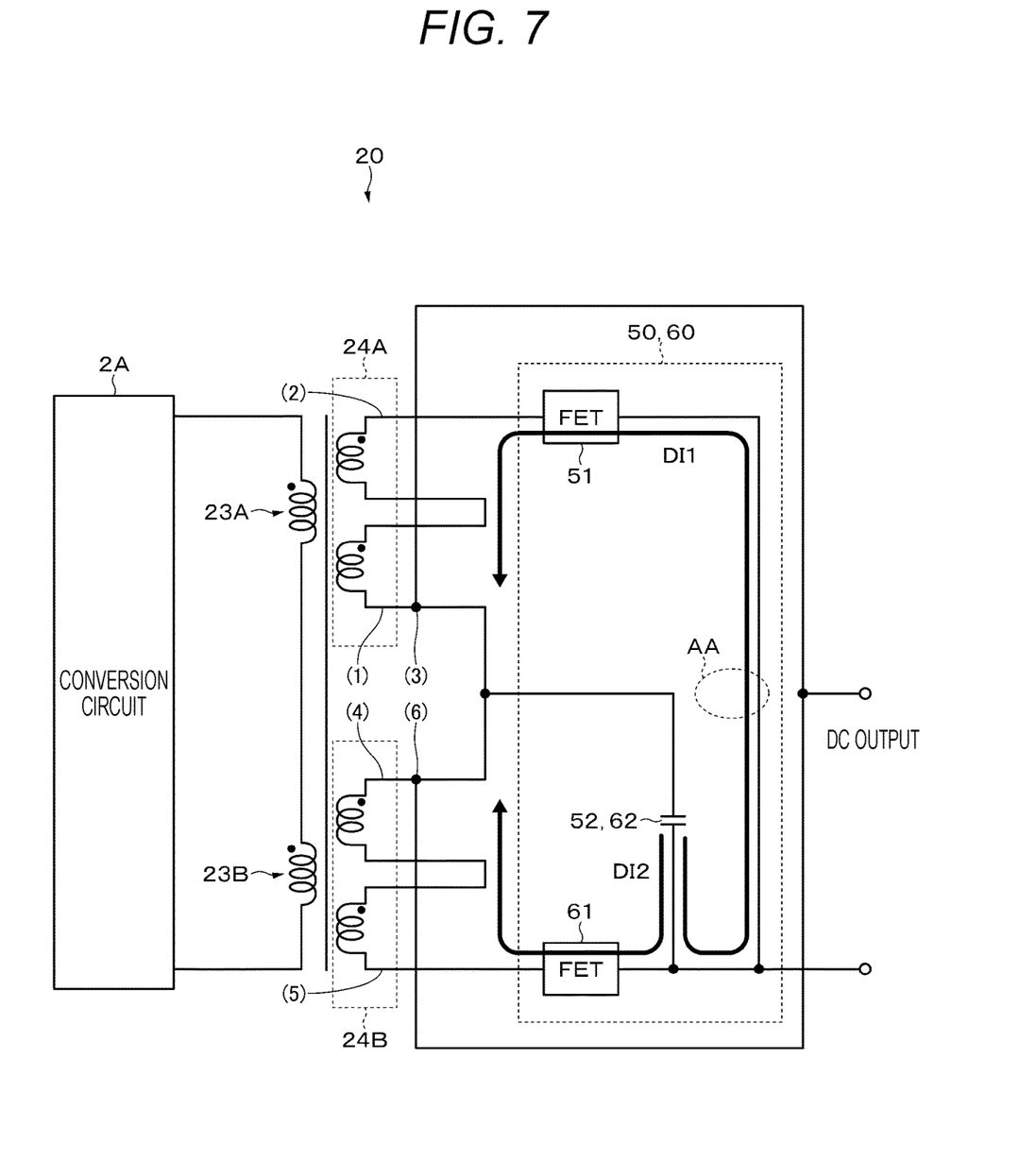
FIG. 7 is a circuit diagram for describing a circuit configuration of the transformer according to the embodiment of the present disclosure.
Figure 8:
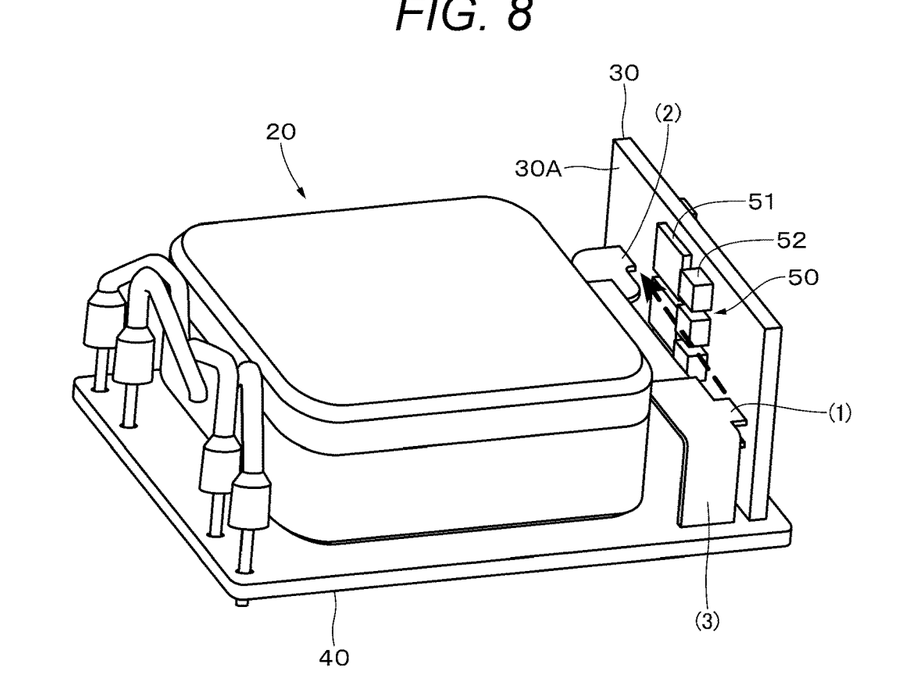
FIG. 8 is a diagram to be referred to in describing an operation example of the transformer according to the embodiment of the present disclosure.
Figure 9:
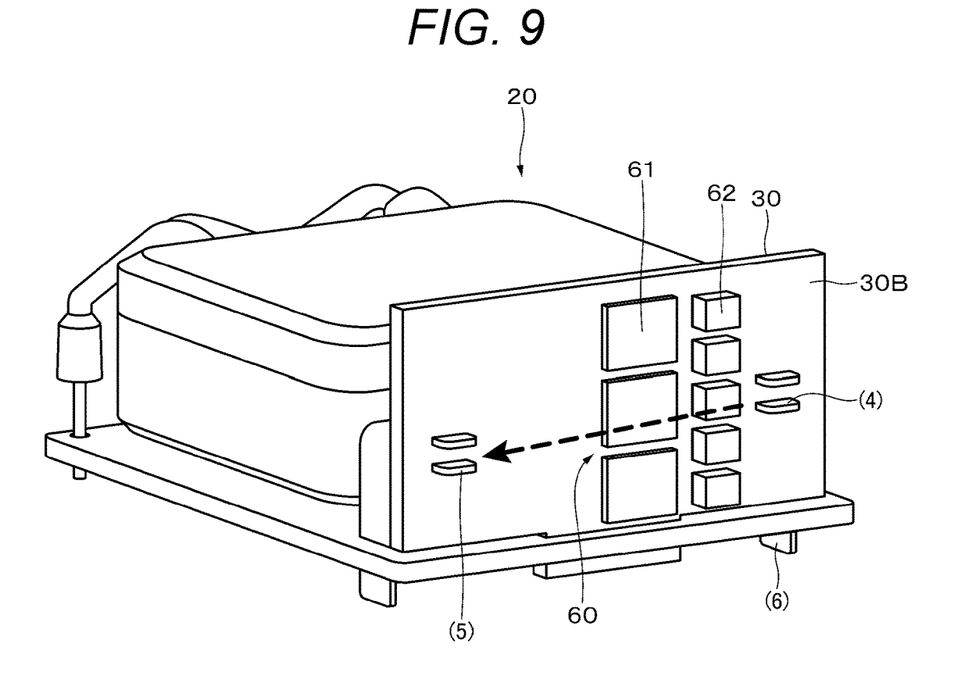
FIG. 9 is a diagram to be referred to in describing the operation example of the transformer according to the embodiment of the present disclosure.

Next, an operation example (current flow) of the transformer 20 will be described with reference to FIGS. 7 to 9. FIG. 7 is a circuit diagram corresponding to an example of the circuit configuration of the transformer 20. FIGS. 8 and 9 are diagrams for describing the flow of current in the transformer 20. Note that for easy understanding, locations of corresponding terminal portions are indicated by (1) and the like in FIGS. 7 to 9. Furthermore, although the circuit diagram of FIG. 7 shows only a single rectifier capacitor, the rectifier capacitor is provided in each of the rectifier circuit 50 and the rectifier circuit 60 in the present embodiment. Note that in the following description, a FET and a rectifier capacitor included in the rectifier circuit 50 are referred to as a FET 51 and a rectifier capacitor 52, and a FET and a rectifier capacitor included in the rectifier circuit 60 are referred to as a FET 61 and a rectifier capacitor 62, respectively.

As shown in the circuit diagram of FIG. 7, a connection for direct current output in the first substrate 30 provided at a location indicated by the reference symbol AA has been removed from the circuit of the transformer 20, so that an output loss in the first substrate 30 is reduced.

FIG. 7 schematically shows the flow of alternating current before rectification in a case where the FET 51 included in the rectifier circuit 50 is turned on. The flow of alternating current is indicated by DI1 in FIG. 7. Furthermore, FIG. 7 schematically shows the flow of alternating current before rectification in a case where the FET 61 included in the rectifier circuit 60 is turned on. The flow of alternating current is indicated by DI2 in FIG. 7.

A conversion circuit 2A on the primary side converts a DC voltage input to the conversion circuit 2A into an AC voltage, and outputs the AC voltage to the primary coils 23A and 23B. As a result of applying the AC voltage to the primary coils 23A and 23B, an AC voltage is generated on the secondary side of the transformer 20. This causes an alternating current to flow. According to a change in the direction of current on the primary side, the FET 51 and the FET 61 are turned on/off in a complementary manner, that is, alternately to rectify current flowing on the secondary side. Note that the FETs 51 and 61 are turned on/off in response to a control signal from a control device (not shown).

In a case where the FET 51 is turned on, an alternating current flows through the secondary coil 24A. The alternating current flows from the first terminal portion 202B (location indicated by (1)) to the rectifier circuit 50 formed on the main surface 30A side of the substrate 30. The flow of alternating current is schematically shown by a dotted arrow in FIG. 8. The alternating current DI1 flows from the rectifier capacitor 52 of the rectifier circuit 50 through the FET 51 and the first terminal portion 202A (location indicated by (2)) to the base 201, that is, a metal conductor of the secondary coil 24A. Then, the alternating current DI1 flows through the metal conductor of the secondary coil 24A, and further flows through the first terminal portion 202B (location indicated by (3)).

In a case where the FET 61 is turned on, an alternating current flows through the secondary coil 24B. The alternating current flows from the first terminal portion 212B (location indicated by (4)) to the rectifier circuit 60 formed on the main surface 30B side of the substrate 30. The flow of alternating current is schematically shown by a dotted arrow in FIG. 9. The alternating current DI2 flows from the rectifier capacitor 62 of the rectifier circuit 60 through the FET 61 and the first terminal portion 212A (location indicated by (5)) to the base 211, that is, a metal conductor of the secondary coil 24B. Then, the alternating current DI2 flows through the metal conductor of the secondary coil 24B, and further flows through the first terminal portion 212B (location indicated by (6)). Direct current is output from the second terminal portions 203 and 213 and supplied to a load.

[Examples of Effects to Be Achieved in Embodiment]

For example, according to the embodiment of the present disclosure, the following effects can be achieved.

The secondary coil of the transformer 20 includes the second terminal portion. As a result, it becomes possible to cause a direct current to be output to an arbitrary location (substrate). Furthermore, since the secondary coil directly serves as a path through which a direct current flows, there is no need to add parts for causing the direct current to be output to an arbitrary location. Therefore, it is possible to prevent, for example, an increase in the number of parts, an associated increase in cost, and a decrease in manufacturability.

Furthermore, it is possible to reduce direct current flowing through the first substrate 30. Therefore, it is possible to prevent deterioration and burnout due to heat generation of the first substrate 30. Furthermore, reduction of heat generation in the first substrate 30 enables not only reduction of heat generation of the switching element but also improvement in the efficiency of a power supply. In addition, it is possible to prevent circuit elements from being adversely affected by heat generation.

Moreover, a substrate (first substrate 30) on which a synchronous rectifier circuit is mounted is separated from a main substrate (second substrate 40), and the first substrate 30 is disposed in the vicinity of the transformer 20. As a result, it becomes possible to perform rectification in the vicinity of the transformer 20. That is, since a path (alternating current loop) through which alternating current flows can be shortened, occurrence of loss can be prevented, and accordingly, a decrease in efficiency can be prevented.

Furthermore, as a result of separating the substrate (first substrate 30) on which the synchronous rectifier circuit is mounted from the main substrate (second substrate 40), it is not necessary to extend the first terminal portion of the transformer 20 to the second substrate 40. This enables occurrence of loss to be prevented. Accordingly, efficiency can be improved. In addition, flexibility in the circuit configuration of the power supply device can be increased.

Moreover, as a result of providing rectifier circuits in accordance with the number of coil portions, it is possible to separate respective current paths in the coil portions. This enables circuit connection by a current loop at the shortest distance. Thus, occurrence of loss can be prevented.

2. Variations

One embodiment of the present disclosure has been specifically described above. However, the contents of the present disclosure are not limited to the embodiment described above, and various modifications based on the technical idea of the present disclosure can be made.

In the above-described embodiment, the base 201 except portions where the first terminal portions 202A and 202B and the second terminal portion 203 of the coil 24A on the secondary side are provided may be molded with resin or the like. Furthermore, the base 201 may be subjected to surface treatment such as applying tin plating so as to prevent oxidation. The same applies to the secondary coil 24B.

An example in which the second terminal portion 203 of the secondary coil 24A is continuously formed with the base 201 and the like has been described in the above embodiment. However, the second terminal portion 203 may be formed separately from the base 201 and the like and integrated therewith with solder, screws, or the like. However, this requires an apparatus for integration. Therefore, it is preferable that the second terminal portion 203 of the secondary coil 24A be formed continuously with the base 201 and the like. The same applies to the secondary coil 24B.

In the above-described embodiment, the first substrate 30 may be omitted, and the rectifier circuit may be mounted on the second substrate 40. Even with such a configuration, it is possible to output a direct current in accordance with the layout of the mounted circuit by using the coil portion described in the embodiment.

The configurations, methods, processes, shapes, materials, numerical values, and the like described in the above embodiment are merely examples, and other configurations, methods, processes, shapes, materials, numerical values, and the like may be used as necessary. For example, the arrangement of the primary coil and the secondary coil can be appropriately changed. Furthermore, the matters described in the embodiment and the variations can be combined with each other as long as no technical contradiction occurs.

Note that the present disclosure can also adopt the following configurations.

(1)
An electronic component including:
a coil portion that includes a base that includes a conductive metal, a first terminal portion connected to a circuit board on which a rectifier circuit is mounted, and a second terminal portion that outputs a direct current rectified by the rectifier circuit.

(2)
The electronic component according to (1), in which
the base, the first terminal portion, and the second terminal portion are continuously formed.

(3)
The electronic component according to (1) or (2), in which
the first terminal portion is provided at both ends of the base, and
the second terminal portion is provided in the vicinity of one of the first terminal portions.

(4)
The electronic component according to any one of (1) to (3), in which
the first terminal portion and the second terminal portion extend in directions substantially orthogonal to each other.

(5)
The electronic component according to any one of (1) to (4), in which
the coil portion is a coil on a secondary side.

(6)
The electronic component according to any one of (1) to (5), further including:
a core; and a primary coil.

(7)
A power supply device including:
an electronic component that includes at least a coil portion on a secondary side; a first substrate on which a rectifier circuit is mounted; and a second substrate on which the electronic component is mounted,
in which the coil portion includes a base that includes a conductive metal, a first terminal portion connected to the first substrate, and a second terminal portion connected to the second substrate, the second terminal portion being configured to output a direct current rectified by the rectifier circuit.

(8)
The power supply device according to (7), in which
the first substrate is supported by the second substrate at a position close to the electronic component.

(9)
The power supply device according to (8), in which
the first substrate is supported in a direction substantially orthogonal to the second substrate.

(10)
The power supply device according to any one of (7) to (9), in which
the electronic component includes a plurality of the coil portions, and
a rectifier circuit corresponding to each of the plurality of coil portions is mounted on the first substrate.

(11)
The power supply device according to (10), in which
the electronic component includes the two coil portions, and
a rectifier circuit corresponding to each of the two coil portions is mounted on front and back surfaces of the first substrate.

(12)
A vehicle including the power supply device according to any one of (7) to (11).

3 Application Examples

"Residential Power Storage System as Application Example"

Figure 10:
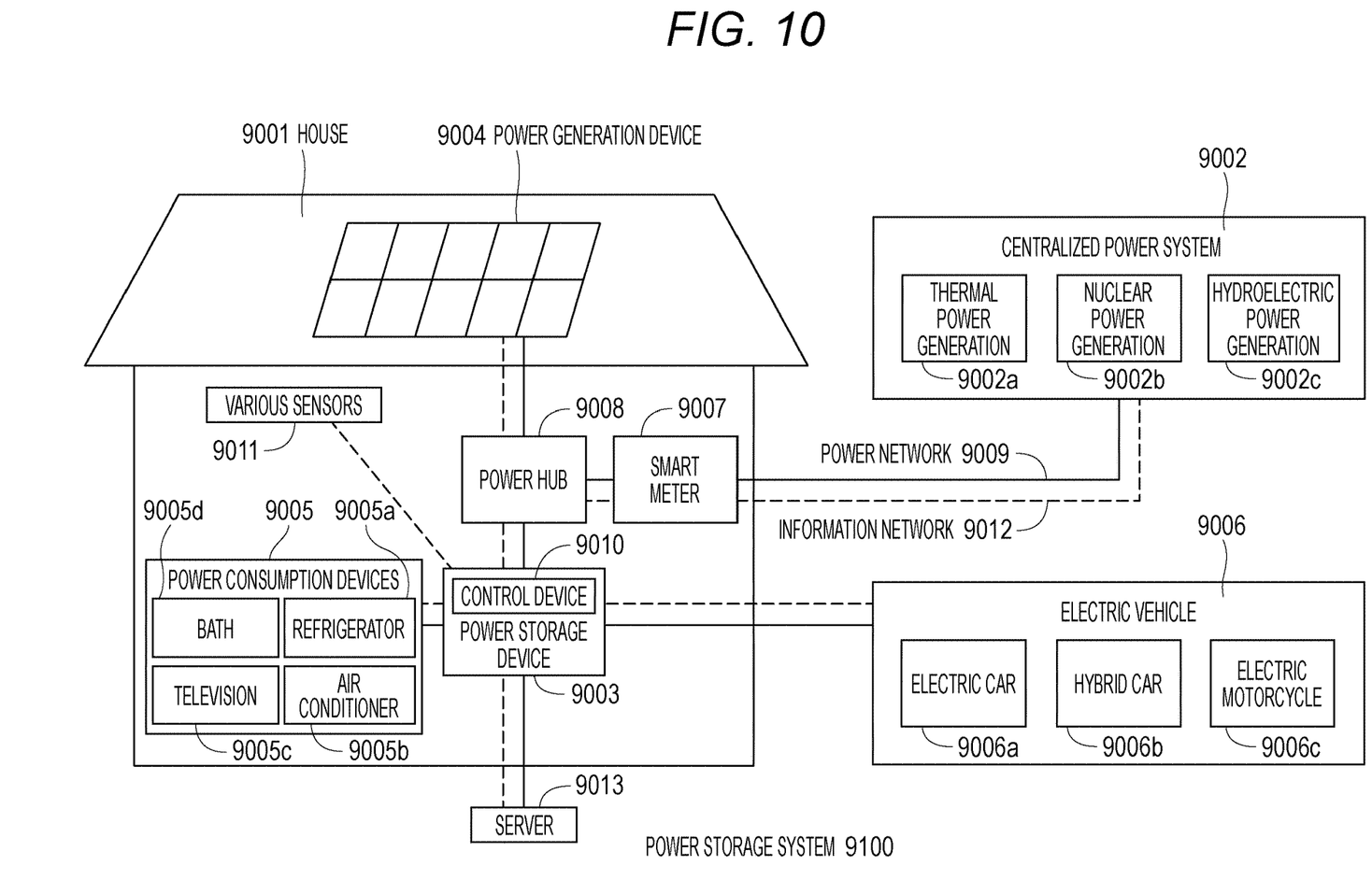
FIG. 10 is a diagram for describing an application example.

An example in which the present disclosure has been applied to a residential power storage system will be described with reference to FIG. 10. For example, in a power storage system 9100 for use in a house 9001, electricity is supplied from a centralized power system 9002 including thermal power generation 9002a, nuclear power generation 9002b, hydroelectric power generation 9002c, and the like to a power storage device 9003 via a power network 9009, an information network 9012, a smart meter 9007, a power hub 9008, or the like. At the same time, electricity is supplied to the power storage device 9003 from an independent power supply such as a home power generation device 9004. The electricity supplied to the power storage device 9003 is stored. Electricity to be used in the house 9001 is supplied by use of the power storage device 9003. A similar power storage system can be used not only for the house 9001 but also for buildings.

The house 9001 is provided with the power generation device 9004, power consumption devices 9005, the power storage device 9003, a control device 9010 that controls each device, the smart meter 9007, and sensors 9011 that acquires various types of information. Each device is connected by the power network 9009 and the information network 9012. A solar cell, a fuel cell, or the like is used as the power generation device 9004, and generated electricity is supplied to the power consumption devices 9005 and/or the power storage device 9003. The power consumption devices 9005 include a refrigerator 9005a, an air conditioner 9005b, a television 9005c, a bath 9005d, and the like. Moreover, the power consumption devices 9005 include electric vehicles 9006. The electric vehicles 9006 include an electric car 9006a, a hybrid car 9006b, and an electric motorcycle 9006c.

A battery unit according to the present disclosure described above is applied to the power storage device 9003. The power storage device 9003 includes a secondary battery or a capacitor. For example, the power storage device 9003 includes a lithium-ion battery. The lithium-ion battery may be of a stationary type or may be the one to be used in the electric vehicle 9006. The smart meter 9007 has a function of measuring the amount of commercial power usage and transmitting the measured usage amount to an electric power company. The power network 9009 may include any one of direct current feed, alternating current feed, and non-contact feed, or may include a combination of any two or more thereof.

The various sensors 9011 include, for example, a human sensor, an illuminance sensor, an object detection sensor, a power consumption sensor, a vibration sensor, a contact sensor, a temperature sensor, and an infrared sensor. Information acquired by the various sensors 9011 is transmitted to the control device 9010. Weather conditions, the condition of a person, and the like can be grasped on the basis of the information from the sensors 9011. Thus, the power consumption devices 9005 can be automatically controlled to minimize energy consumption. Moreover, the control device 9010 can transmit information regarding the house 9001 to an external electric power company or the like via the Internet.

The power hub 9008 performs processing such as branching of power lines and DC/AC conversion. Communication methods to be used in the information network 9012 connected to the control device 9010 include a method of using a communication interface such as a universal asynchronous receiver-transmitter (UART) and a method of using a sensor network based on a wireless communication standard such as Bluetooth (registered trademark), ZigBee (registered trademark), or Wi-Fi (registered trademark). The Bluetooth (registered trademark) method is applied to multimedia communication, and enables one-to-many connection communication. ZigBee (registered trademark) uses the physical layer of the institute of electrical and electronics engineers (IEEE) 802.15.4. IEEE 802.15.4 is the name of a short-range wireless network standard called a personal area network (PAN) or wireless (W) PAN.

The control device 9010 is connected to an external server 9013. The server 9013 may be managed by any one of the house 9001, an electric power company, and a service provider. The server 9013 transmits/receives information such as power consumption information, life pattern information, power charges, weather information, natural disaster information, and information regarding power transactions. These kinds of information may be transmitted/received by a power consumption device (for example, a television) in the house, but may be transmitted/received by a device outside the house (for example, a cellular phone). These kinds of information may be displayed on a device having a display function, such as a television, a cellular phone, or a personal digital assistant (PDA).

The control device 9010 that controls each unit includes a central processing unit (CPU), a random access memory (RAM), a read only memory (ROM), and the like, and is stored in the power storage device 9003 in this example. The control device 9010 is connected to the power storage device 9003, the home power generation device 9004, the power consumption devices 9005, the various sensors 9011, and the server 9013 via the information network 9012. The control device 9010 has a function of adjusting, for example, the amount of commercial power usage and the amount of power generation. Note that, in addition, the control device 9010 may also have a function of, for example, conducting power transactions in the electric power market.

As described above, not only electricity from the centralized power system 9002 such as the thermal power 9002a, the nuclear power 9002b, and the hydropower 9002c, but also electricity generated by the home power generation device 9004 (solar power generation and wind power generation) can be stored in the power storage device 9003. Therefore, it is possible to perform control such that the amount of electricity to be sent to the outside is kept constant or electricity is discharged as needed even if electricity generated by the home power generation device 9004 fluctuates. For example, the power storage system 9100 can be used not only for storing electricity generated by solar power generation in the power storage device 9003, but also for storing nighttime power, which costs less, in the power storage device 9003 at night and for discharging and using the stored power by means of the power storage device 9003 in the daytime in which electricity costs more.

Note that although an example in which the control device 9010 is stored in the power storage device 9003 has been described in the present application example, the control device 9010 may be stored in the smart meter 9007 or may be separately configured. Moreover, the power storage system 9100 may be used for a plurality of families in an apartment house, or may be used for a plurality of detached houses.

An example of the power storage system 9100 to which the technology according to the present disclosure can be applied has been described above. The technology according to the present disclosure can be suitably applied to the power storage device 9003 among the constituent elements described above.

"Vehicle Power Storage System as Application Example"

Figure 11:
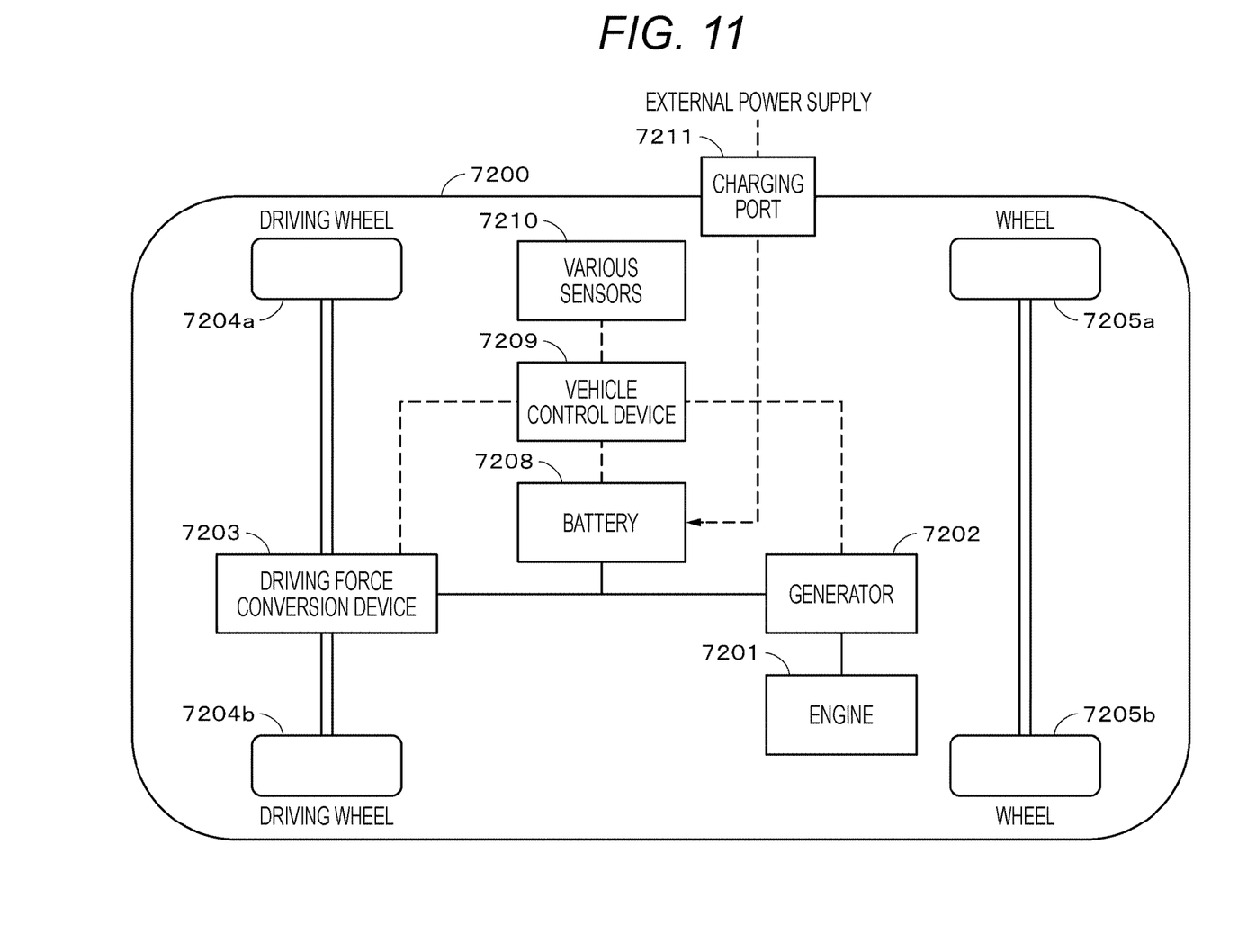
FIG. 11 is a diagram for describing an application example.

An example in which the present disclosure has been applied to a power storage system for a vehicle will be described with reference to FIG. 11. FIG. 11 schematically shows an example of a configuration of a hybrid vehicle that employs a series hybrid system to which the present disclosure is applied. A series hybrid system refers to a car that runs on a power driving force conversion device by using electricity generated by a generator driven by an engine or the electricity once stored in a battery.

This hybrid vehicle, that is, a hybrid vehicle 7200 includes an engine 7201, a generator 7202, a power driving force conversion device 7203, a driving wheel 7204a, a driving wheel 7204b, a wheel 7205a, a wheel 7205b, a battery 7208, a vehicle control device 7209, various sensors 7210, and a charging port 7211. The above-described power storage device according to the present disclosure is applied to the battery 7208.

The hybrid vehicle 7200 runs by using the power driving force conversion device 7203 as a power source. An example of the power driving force conversion device 7203 is a motor. The power driving force conversion device 7203 is operated by electricity from the battery 7208, and the turning force of the power driving force conversion device 7203 is transmitted to the driving wheels 7204a and 7204b. Note that the power driving force conversion device 7203 can be applied to either an AC motor or a DC motor by use of DC-AC or reverse conversion (AC-DC conversion) at necessary points. The various sensors 7210 control engine speed through the vehicle control device 7209, and also control the opening (throttle opening) of a throttle valve (not shown). The various sensors 7210 include a speed sensor, an acceleration sensor, an engine speed sensor, and the like.

The turning force of the engine 7201 is transmitted to the generator 7202. Electricity generated by the generator 7202 by use of the turning force can be stored in the battery 7208.

When the hybrid vehicle decelerates by a braking mechanism (not shown), a resistance force at the time of deceleration is applied as a turning force to the power driving force conversion device 7203. Thus, regenerative power generated by the power driving force conversion device 7203 by use of the turning force is stored in the battery 7208.

The battery 7208 can be connected to a power supply external to the hybrid vehicle to receive electricity supplied from the external power supply through the charging port 7211 as an input port, and to store the received electricity.

Although not shown, an information processing device may be provided which performs information processing related to vehicle control on the basis of information regarding a secondary battery. Examples of such an information processing device include an information processing device that displays a remaining battery level on the basis of information regarding the remaining battery level.

Note that described above as an example is a series hybrid car that runs with a motor by using electricity generated by a generator driven by an engine or the electricity stored once in a battery. However, the present disclosure can also be effectively applied to a parallel hybrid car that uses both engine and motor outputs as drive sources, and uses the following three modes while appropriately switching therebetween: running with the engine alone, running with the motor alone, and running with both the engine and the motor. Moreover, the present disclosure can also be effectively applied to a so-called electric vehicle that runs while driven only by a drive motor without using an engine.

An example of the hybrid vehicle 7200 to which the technology according to the present disclosure can be applied has been described above. The technology according to the present disclosure can be suitably applied to the battery 7208 among the constituent elements described above.

REFERENCE SIGNS LIST

10 Power supply device
20 Transformer
22A, 22B Core
23A, 23B Primary coil
24A, 24B Secondary coil
201, 211 Base
202A, 202B, 212A, 212B First terminal portion
203, 213 Second terminal portion
30 First substrate
30A Front surface
30B Back surface
40 Second substrate
50, 60 Rectifier circuit
7200 Hybrid vehicle

What is claimed is:

1. An electronic component comprising:
a first coil formed of a conductive metal, the first coil comprising:
a base comprising a first end and a second end;
two or more first terminal portions configured to connect to a circuit board on which a rectifier circuit is mounted, wherein:
a first of the two or more first terminal portions is provided at the first end of the base, and
a second of the two or more first terminal portions is provided at the second end of the base; and
a second terminal portion configured to output a direct current rectified by the rectifier circuit extending in a direction substantially orthogonal to the first terminal portions.

2. The electronic component according to claim 1, wherein
the base, the two or more first terminal portions, and the second terminal portion are continuously formed.

3. The electronic component according to claim 1, wherein
the second terminal portion is provided in a vicinity of one of the first terminal portions.

4. The electronic component according to claim 1, wherein the first coil is on a secondary side of a transformer.

5. The electronic component according to claim 1, further comprising:
a primary coil, wherein the first coil is a secondary coil.

6. A power supply device comprising:
an electronic component including at least a first coil on a secondary side;
a first substrate on which a first rectifier circuit is mounted; and
a second substrate on which the electronic component is mounted,
wherein the first coil is formed of a conductive metal and comprises:
a base comprising a first end and a second end,
two or more first terminal portions configured to connect to a circuit board on which a rectifier circuit is mounted, wherein:
a first of the two or more first terminal portions is provided at the first end of the base, and
a second of the two or more first terminal portions is provided at the second end of the base, and
a second terminal portion configured to output a direct current rectified by the first rectifier circuit extending in a direction substantially orthogonal to the first terminal portions.

7. The power supply device according to claim 6, wherein the first substrate is supported by the second substrate at a position close to the electronic component.

8. The power supply device according to claim 7, wherein the first substrate is supported in a direction substantially orthogonal to the second substrate.

9. The power supply device according to claim 6, wherein the electronic component includes a second coil, and
a second rectifier circuit corresponding to the second coil is mounted on the first substrate.

10. The power supply device according to claim 9, wherein
the first rectifier circuit is mounted on a front surface of the first substrate and the second rectifier circuit is mounted on a back surface of the first substrate.

11. The power supply device according to claim 6, wherein the base, the one two or more first terminal portions, and the second terminal portion are continuously formed.

12. The power supply device according to claim 6, wherein
the second terminal portion is provided in a vicinity of one of the first terminal portions.

13. The power supply device according to claim 6, further comprising a primary coil, wherein the first coil is a secondary coil.

14. A vehicle comprising a power supply device, the power supply device comprising:
an electronic component including at least a first coil on a secondary side;
a first substrate on which a first rectifier circuit is mounted; and
a second substrate on which the electronic component is mounted, wherein the first coil is formed of a conductive metal and comprises:
a base comprising a first end and a second end,
two or more first terminal portions configured to connect to a circuit board on which a rectifier circuit is mounted, wherein:
a first of the two or more first terminal portions is provided at the first end of the base, and
a second of the two or more first terminal portions is provided at the second end of the base, and
a second terminal portion configured to output a direct current rectified by the first rectifier circuit extending in a direction substantially orthogonal to the first terminal portions.

15. The vehicle according to claim 14, wherein the base, the two or more first terminal portions, and the second terminal portion are continuously formed.

16. The vehicle according to claim 14, wherein
the second terminal portion is provided in a vicinity of one of the first terminal portions.

17. The vehicle according to claim 14, wherein the first coil is on a secondary side of a transformer.

18. The vehicle according to claim 14, further comprising:
a primary coil, wherein the first coil is a secondary coil.

19. The vehicle according to claim 14, wherein the first substrate is supported by the second substrate at a position close to the electronic component.

20. The vehicle according to claim 14, wherein the rectifier circuit is mounted
on a front surface of the first substrate.

* * * * *